(12) United States Patent
Tsai

(10) Patent No.: US 12,329,140 B1
(45) Date of Patent: Jun. 17, 2025

(54) ARTIFICIAL BAIT FOR FISHING

(71) Applicant: Ever Grass International Co., LTD., Changhua County (TW)

(72) Inventor: Tsung-Hsi Tsai, Changhua County (TW)

(73) Assignee: EVER GRASS INTERNATIONAL CO., LTD., Changhua County (TW)

(*) Notice: Subject to any disclaimer, the term of this patent is extended or adjusted under 35 U.S.C. 154(b) by 0 days.

(21) Appl. No.: 18/798,796

(22) Filed: Aug. 8, 2024

(51) Int. Cl.
 *A01K 85/01* (2006.01)
 *A01K 85/00* (2006.01)

(52) U.S. Cl.
 CPC ........ *A01K 85/017* (2022.02); *A01K 85/1811* (2022.02); *A01K 85/1847* (2022.02)

(58) Field of Classification Search
 CPC .............................. A01K 85/017; A01K 85/14
 See application file for complete search history.

(56) References Cited

U.S. PATENT DOCUMENTS

| | | | | |
|---|---|---|---|---|
| 3,020,668 A * | 2/1962 | O'Neil | ................... | A01K 85/12 |
| | | | | 43/42.16 |
| 4,641,455 A * | 2/1987 | Johnson | ................. | A01K 85/01 |
| | | | | 43/42.31 |
| 5,044,110 A * | 9/1991 | Henderson | ............. | A01K 85/14 |
| | | | | 43/42.31 |
| D374,907 S * | 10/1996 | Ketchum | ..................... | D22/129 |
| 5,887,378 A * | 3/1999 | Rhoten | .................. | A01K 85/14 |
| | | | | 43/42.23 |
| 6,643,975 B1 * | 11/2003 | Edwards | ................ | A01K 85/14 |
| | | | | 43/42.31 |
| 7,621,068 B1 * | 11/2009 | Renosky | ................ | A01K 85/16 |
| | | | | 43/42.49 |
| 8,943,737 B1 * | 2/2015 | Palmer | .................... | A01K 85/12 |
| | | | | 43/4.5 |
| 10,426,149 B1 * | 10/2019 | Coxey | .................... | A01K 85/14 |
| 10,477,845 B1 * | 11/2019 | Davis | ..................... | A01K 85/02 |
| 11,540,499 B1 * | 1/2023 | Rye | ........................ | A01K 85/14 |
| D1,016,965 S * | 3/2024 | Payne | .................... | A01K 85/14 |
| | | | | D22/129 |
| 2007/0199234 A1 * | 8/2007 | Davis | ..................... | A01K 85/00 |
| | | | | 43/42.15 |
| 2009/0211145 A1 * | 8/2009 | Thorne | .................. | A01K 85/00 |
| | | | | 43/43.15 |

(Continued)

FOREIGN PATENT DOCUMENTS

CA 3218718 A1 * 5/2024 ............. A01K 85/14

*Primary Examiner* — Christopher P Ellis
(74) *Attorney, Agent, or Firm* — Chun-Ming Shih; LANWAY IPR SERVICES

(57) ABSTRACT

An artificial bait for fishing contains a body and a movable sheet. The body includes a head, a loop element, and a fishhook connected on and end of the body opposite to the head. The movable sheet is connected with the body and swings back and forth with respect to the body. The movable sheet is formed in a polygon shape, and the movable sheet includes a fixing orifice defined on a bottom thereof to connect with the loop element, a groove formed on a center thereof and configured to receive a fishing line, a knock zone defined between the fixing orifice and the groove and configured to making noises when the knock zone touches the head of the body, and a hollow accommodate chamber located adjacent to the groove and formed in a capsule shape to accommodate multiple steel balls.

5 Claims, 6 Drawing Sheets

(56) References Cited

U.S. PATENT DOCUMENTS

| | | | |
|---|---|---|---|
| 2013/0047491 A1* | 2/2013 | Davis | A01K 85/14 |
| | | | 43/42.49 |
| 2020/0128805 A1* | 4/2020 | Kovacs | A01K 85/02 |
| 2020/0344986 A1* | 11/2020 | Queen | A01K 85/14 |
| 2021/0251205 A1* | 8/2021 | Schwartz | A01K 85/14 |
| 2023/0301283 A1* | 9/2023 | Renosky | A01K 85/18 |

* cited by examiner

ARTIFICIAL BAIT FOR FISHING

TECHNICAL FIELD

The present invention relates to an artificial bait for fishing, and more particularly to the artificial bait for fishing perches.

BACKGROUND

As shown in FIG. 1, an artificial bait for fishing perches consists: a body 90 and a movable sheet 91. The body 90 has a fishhook 92, and the movable sheet 91 is connected with a fishing rod. When the body 90 is put into the waters and is dragged, the movable sheet 91 continuously swings leftward and rightward ahead of the body 90. In the meantime, the movable sheet 91 makes noises when it touches the body 90. The propagation speed of noises in the waters is faster than that in the air, which can attract the perch to bite the artificial bait, and then hook the perches with the fishhook 92 of the f 90, thus catching the perches.

However, the conventional artificial bait can only produce noises in the first time, because the movable sheet 91 touches the body 90. If the drag speed is slow, the noises and frequency generated by the artificial bait will be lower, thus making it more difficult to attract perches.

The present invention has arisen to mitigate and/or obviate the afore-described disadvantages.

SUMMARY

The primary aspect of the present invention is to provide an artificial bait for fishing by which the fishing line of a fishing rod is tied in the groove of the movable sheet, and the artificial bait is put into the waters; when the fishing rod is moved, the movable sheet wings back and forth so that the knock zone of the movable sheet touches the head of the body to make first noise, wherein when the movable sheet swings, the multiple steel balls of the hollow accommodation chamber hit with one another to make second or more noises, thus attracting the fishes to bite the artificial bait.

Further aspect of the present invention is to provide an artificial bait for fishing by which the head is detachable from the fishing hook to replace another fishing hook based on the using requirements.

Another aspect of the present invention is to provide an artificial bait for fishing by which the body is connected with artificial tentacles to obtain an effect of simulated creatures.

To obtain above-mentioned aspects, an artificial bait for fishing provided by the present invention contains: a body and a movable sheet.

The body includes a head connected on an end of the body, a loop element connected on an end of the head, and a fishhook connected on the other end of the body opposite to the head.

The movable sheet is connected with the body and swings back and forth with respect to the body. The movable sheet is formed in a polygon shape, and the movable sheet includes a fixing orifice defined on a bottom thereof to connect with the loop element, a groove formed on a center thereof and configured to receive a fishing line, a knock zone defined between the fixing orifice and the groove and configured to making noises when the knock zone touches the head of the body, and a hollow accommodate chamber located adjacent to the groove and formed in a capsule shape to accommodate multiple steel balls.

Preferably, the knock zone of the movable sheet is an iron plate, and the movable sheet is made of plastic, wherein the iron plate and the multiple steel balls are placed into a mold so that the knock zone covers the movable sheet in an injection molding manner and the hollow accommodation chamber is formed to accommodate the multiple steel balls.

Preferably, the body further includes a connection portion connected between the other end of the body and the fishhook, and the fishhook has a coupling segment connected with the connection portion of the body.

Preferably, the body is connected with artificial tentacles.

A method of using an artificial bait for the fishing comprises steps of:
tying a fishing line of a fishing rod tied in a groove of a movable sheet; and
putting the artificial bait into waters.

When the fishing rod is moved, the movable sheet swings back and forth so that a knock zone of the movable sheet touches a head of a body to make first noise, and when the movable sheet swings, multiple steel balls of a hollow accommodation chamber of the movable sheet hit with one another to make second or more noises, thus attracting the fishes to bite the artificial bait.

In addition, the loop element is configured to connect the body and the movable sheet so that the artificial bait flow and swing with the waters flexibly.

DETAILED DESCRIPTION

Figure 1:
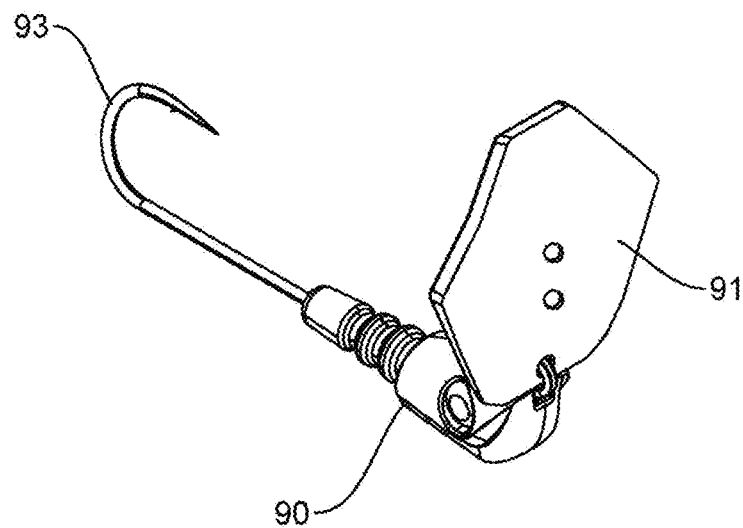
FIG. 1 is a perspective view of a conventional artificial bait for fishing perches.
Figure 2:
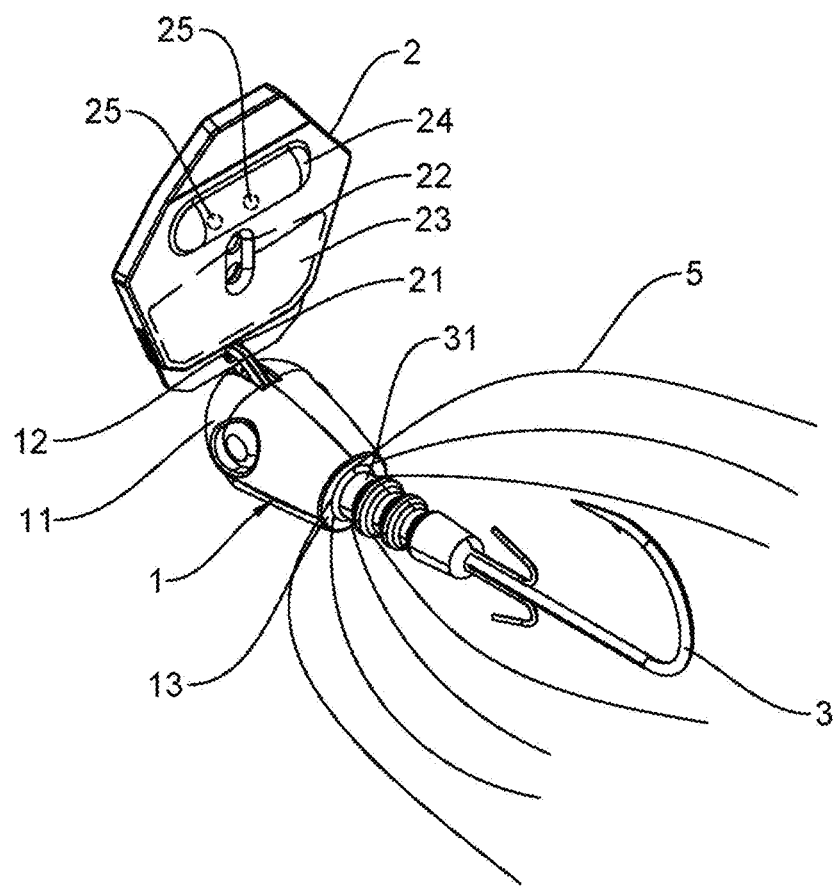
FIG. 2 is a perspective view showing the assembly of an artificial bait for fishing according to a preferred embodiment of the present invention.
Figure 3:
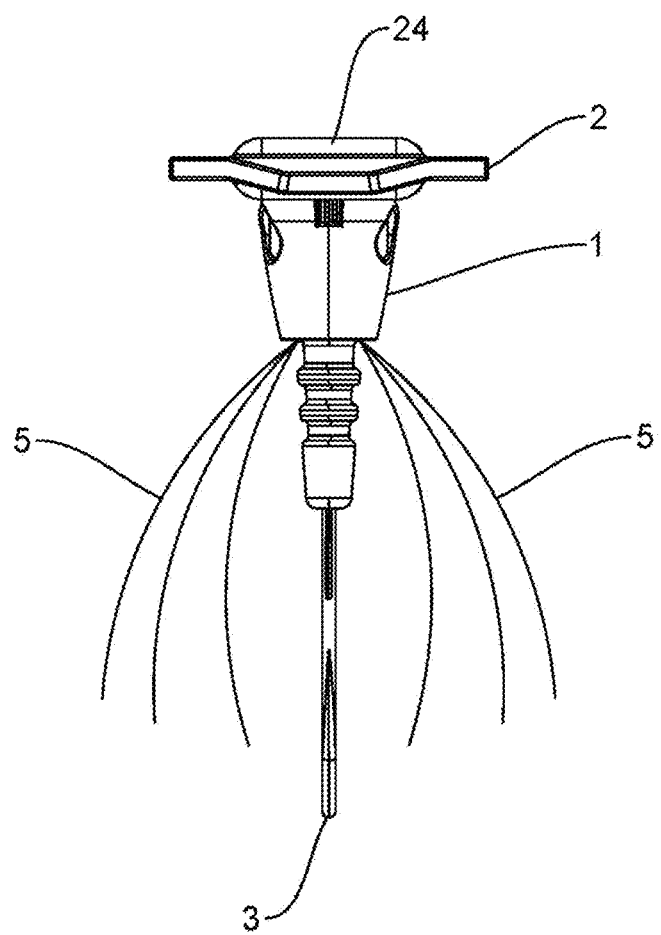
FIG. 3 is a top plan view showing the assembly of the artificial bait for the fishing according to the preferred embodiment of the present invention.
Figure 4:
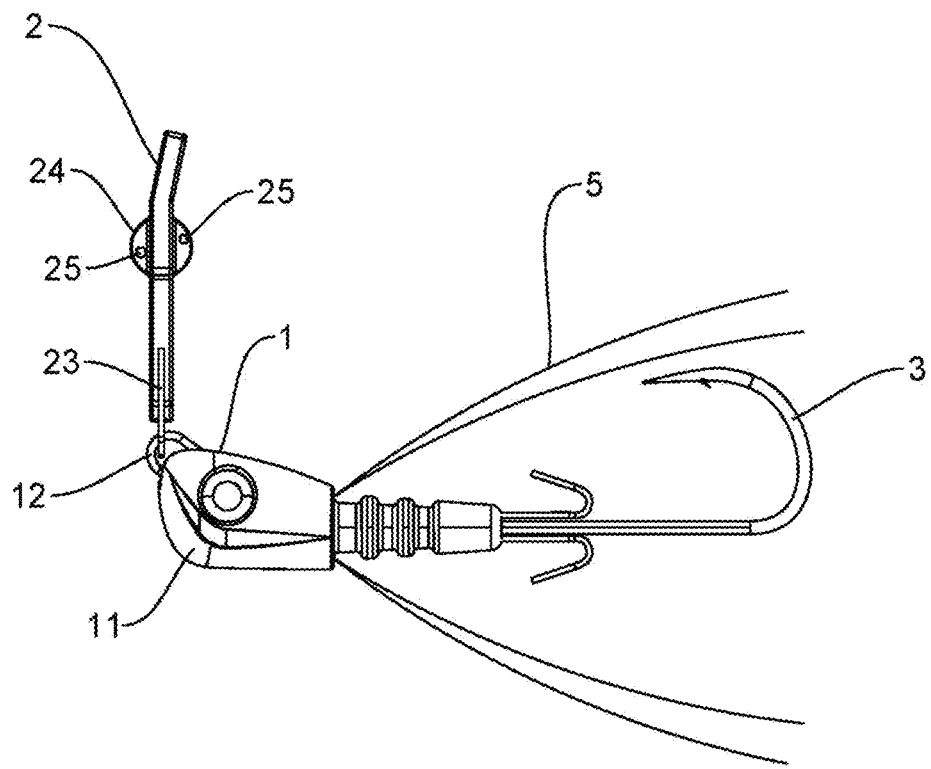
FIG. 4 is a side plan view showing the assembly of the artificial bait for the fishing according to the preferred embodiment of the present invention.

With reference to FIGS. 2-6, an artificial bait for fishing according to a preferred embodiment of the present invention comprises a body 1 and a movable sheet 2.

The body 1 includes a head 11 connected on an end thereof, a loop element 12 connected on an end of the head 11, and a fishhook 3 connected on the other end of the body 1 opposite to the head 11.

The head 11 of the body 1 is formed in any one shape of a fish head, a mollusk (such as a cuttlefish, octopus), and arthropods (such as insects, shrimps and crabs). The body 1 further includes a connection portion 13 connected between the other end of the body 1 and the fishhook 3, and the fishhook 3 has a coupling segment 31 connected with the connection portion 13 of the body 1. Thereby, the fishhook 3 is replaceable based on using requirements (such as a size and a variation of fishes), thus enhancing using variety.

The movable sheet 2 is connected with the body 1 and swings back and forth with respect to the body 1, wherein the movable sheet 2 is formed in a polygon shape, and the movable sheet 2 includes a fixing orifice 21 defined on a bottom thereof to connect with the loop element 12, a groove 22 formed on a center thereof and configured to receive a fishing line 4, a knock zone 23 defined between the fixing orifice 21 and the groove 22 and configured to making noises when the knock zone 23 touches the head 11 of the body 1, and a hollow accommodate chamber 24 located adjacent to the groove 22 and formed in a capsule shape to accommodate multiple steel balls 25.

The knock zone 23 of the movable sheet 2 is an iron plate, and the movable sheet 2 is made of plastic, wherein the iron plate and the multiple steel balls 25 are placed into a mold (not shown) so that the knock zone 23 covers the movable sheet 2 in an injection molding manner and the hollow accommodation chamber 24 is formed to accommodate the multiple steel balls 25.

Figure 5:
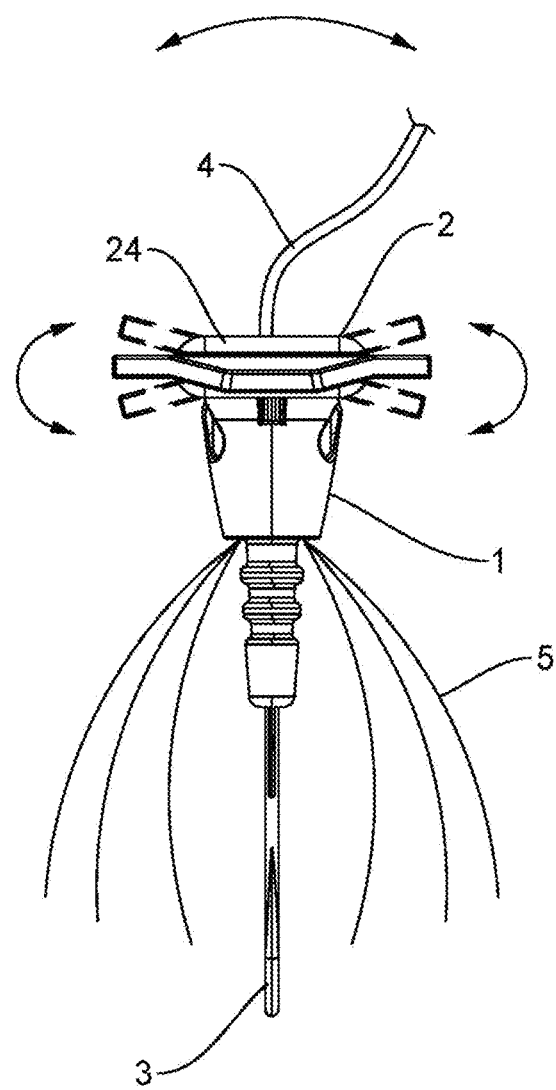
FIG. 5 is a side plan view showing the operation of the artificial bait for the fishing according to the preferred embodiment of the present invention.
Figure 6:
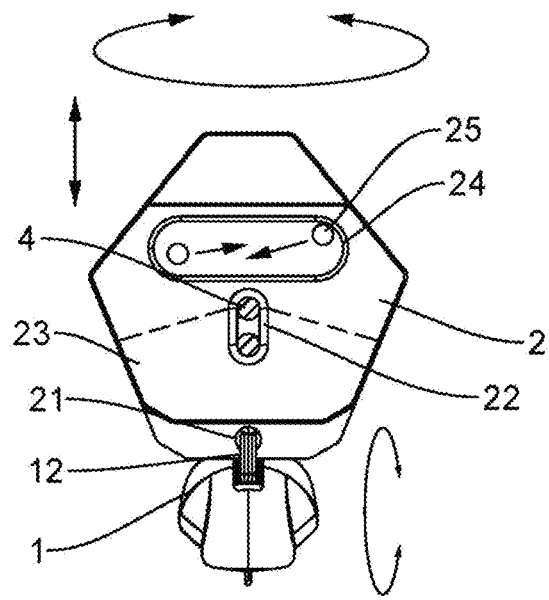
FIG. 6 is another side plan view showing the operation of the artificial bait for the fishing according to the preferred embodiment of the present invention.

Thereby, the artificial bait of the present invention has advantages as follow:

1) Referring to FIGS. 5 and 6, the fishing line of a fishing rod is tied in the groove 22 of the movable sheet 2, and the artificial bait is put into the waters. When the fishing rod is moved, the movable sheet 2 swings back and forth so that the knock zone 23 of the movable sheet 2 touches the head 11 of the body 1 to make first noise, wherein when the movable sheet 2 swings, the multiple steel balls 25 of the hollow accommodation chamber 24 hit with one another to make second or more noises, thus attracting the fishes to bite the artificial bait.
2) The head 11 is detachable from the fishing hook 3 to replace another fishing hook 3 based on the using requirements.
3) The body 1 is connected with artificial tentacles to obtain an effect of simulated creatures.
4) The loop element 12 is configured to connect the body 1 and the movable sheet 2 so that the artificial bait flow and swing with the waters flexibly.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. An artificial bait for fishing comprising:
   a body including a head connected on an end of the body, a loop element connected on an end of the head, and a fishhook connected on the other end of the body opposite to the head;
   a movable sheet connected with the body and swinging back and forth with respect to the body, wherein the movable sheet is formed in a polygon shape, and the movable sheet includes a fixing orifice defined on a bottom thereof to connect with the loop element, a groove formed on a center thereof and configured to receive a fishing line, a knock zone defined between the fixing orifice and the groove and configured to making noises when the knock zone touches the head of the body, and a hollow accommodate chamber located adjacent to the groove and formed in a capsule shape to accommodate multiple steel balls.

2. The artificial bait for the fishing as claimed in claim 1, wherein the knock zone of the movable sheet is an iron plate, and the movable sheet is made of plastic, wherein the iron plate and the multiple steel balls are placed into a mold so that the knock zone covers the movable sheet in an injection molding manner and the hollow accommodation chamber is formed to accommodate the multiple steel balls.

3. The artificial bait for the fishing as claimed in claim 1, wherein the body further includes a connection portion connected between the other end of the body and the fishhook, and the fishhook has a coupling segment connected with the connection portion of the body.

4. The artificial bait for the fishing as claimed in claim 1, wherein the body is connected with artificial tentacles.

5. A method of using an artificial bait for fishing comprises steps of:
   tying a fishing line of a fishing rod tied in a groove of a movable sheet; and
   putting the artificial bait into waters;
   wherein when the fishing rod is moved, the movable sheet swings back and forth so that a knock zone of the movable sheet touches a head of a body to make first noise, and when the movable sheet swings, multiple steel balls of a hollow accommodation chamber of the movable sheet hit with one another to make second or more noises, thus attracting the fishes to bite the artificial bait.

\* \* \* \* \*